United States Patent
Iwaki et al.

(10) Patent No.: US 6,307,291 B1
(45) Date of Patent: Oct. 23, 2001

(54) HYDRAULIC DYNAMIC BEARING AND SPINDLE MOTOR AND ROTARY ASSEMBLY PROVIDED

(75) Inventors: Tadao Iwaki; Isamu Takehara; Yukihiro Nakayama; Ryouji Yoneyama; Takafumi Suzuki; Toshiharu Kogure; Hiromitsu Goto; Naoki Kawawada; Atsushi Ota; Koji Nitadori, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/414,243

(22) Filed: Oct. 7, 1999

(30) Foreign Application Priority Data

| Oct. 8, 1998 | (JP) | 10-286915 |
| Oct. 15, 1998 | (JP) | 10-294270 |
| Oct. 15, 1998 | (JP) | 10-294271 |
| Oct. 1, 1999 | (JP) | 11-280977 |

(51) Int. Cl.$^7$ .................... H02K 5/16; H02K 7/08
(52) U.S. Cl. .................... 310/90; 310/67 R; 310/89; 310/91; 310/261; 310/267
(58) Field of Search .............. 310/90, 89, 67 R, 310/91.5, 90.5

(56) References Cited

U.S. PATENT DOCUMENTS

| 5,089,732 | * | 2/1992 | Konno et al. | 310/67 R |
| 5,559,382 | * | 9/1996 | Oku et al. | 310/90 |
| 5,822,846 | * | 10/1998 | Moritan et al. | 310/90 |
| 5,831,355 | * | 11/1998 | Oku | 310/42 |
| 6,034,454 | * | 3/2000 | Ichiyama | 310/90 |

* cited by examiner

Primary Examiner—Elvin Enad
(74) Attorney, Agent, or Firm—Adams & Wilks

(57) ABSTRACT

The present invention is a double sleeve type fluid dynamic pressure bearing, comprising a fixed shaft having respective ends to be fixed to a utilized apparatus; a rotary sleeve arranged to provide a first fine gap between an inner peripheral surface thereof and an outer peripheral surface of the fixed shaft, a fixed sleeve arranged to provide a second fine gap between an inner peripheral surface thereof and an outer peripheral surface of the rotary sleeve, a holder member arranged to cooperate with a lower end surface of the rotary sleeve to provide a third gap, and wherein the first fine gap and the second fine gap are formed with radial dynamic pressure producing grooves while the third fine gap is formed with a thrust dynamic pressure producing groove, the first, second and third fine gaps being filled with lubrication oil, the first fine gap and the second fine gap having one ends made as opening ends contacting with the air and the other ends made as closed ends communicated with each other through the third fine gap.

54 Claims, 19 Drawing Sheets

HYDRAULIC DYNAMIC BEARING AND SPINDLE MOTOR AND ROTARY ASSEMBLY PROVIDED

BACKGROUND OF THE INVENTION

This invention relates to a rotary apparatus such as hard disc drive (HDD), a spindle motor used as a drive source for such a rotary apparatus and to a fluid dynamic pressure bearing adapted for such a spindle motor bearing. More particularly, the invention relates to a shaft-both-end fixed type fluid dynamic pressure bearing to be fixed at respective ends of its shaft onto a chassis, etc. of a utilized apparatus through screws or the like.

Air dynamic pressure bearings are broadly used in rotary apparatuses such as a HDD, a optical disc drive and light polarizing apparatuses because of such as their light weight of light, clean and smooth rotation, durability to heat and cold, long service life and freedom of contamination to storage media such as discs, by virtue of the nonuse of lubrication oil. Recently, however, there has been a significant increase in the information amount required to be processed. Particularly, the large capacity HDD apparatus is required to rotationally drive as many as five or more discs. This requirement an no longer be met by an air dynamic pressure bearing. To cope with this, fluid dynamic pressure bearings have been adopted for HDD apparatuses that can support load weight greater than that of the air dynamic pressure bearings.

There are disclosures of basic structures and operations of fluid dynamic pressure bearings, e.g., in U.S. Pat. No. 5,112,142; U.S. Pat. No. 5,524,985; U.S. Pat. No. 5,524,986; and U.S. Pat. No. 5,533,812.

The conventional fluid dynamic pressure bearings, particularly the fluid dynamic pressure bearings to rotate the sleeve, includes two kinds of devices, if classified by the manner of fixing the shaft onto a utilized apparatus. One is a shaft-one-end fixed type fluid dynamic pressure bearing as shown in FIG. 18, and the other is a shaft-both-end fixed type fluid dynamic pressure bearing as shown in FIG. 19. First, the fluid dynamic pressure bearing of FIG. 18 is structured by a fixed shaft 1 to be fixed at its lower end onto a chassis 16 or the like through a screw 15, and a rotary sleeve 2 having an upper end covered completely by a lid member 20 and a lower end having an opening 11 forming a capillary seal. Next, the fluid dynamic pressure bearing of FIG. 19 is structured by a fixed shaft 1 to be fixed at respective ends onto a chassis 16 or the like of a utilized apparatus through screws 14 and 15, and a rotary sleeve 2 having openings 11a and 11b forming respective capillary seals at upper and lower ends.

In FIG. 18 and FIGS. 19, 8, 8a, and 8b are radial dynamic pressure producing grooves, while 9a and 9b are thrust dynamic pressure producing grooves. 5, 5a, 5b, 17a, 17b and 17c are fine gaps formed between the fixed shaft 1 and the rotary sleeve 2. These fine gaps are filled therein with lubrication oil 18. The fine gaps have a width of usually 2 to 15 μm, although depending on the size of the fluid dynamic pressure bearing. 13a is an upper screw hole of the fixed shaft, while 13, 13b denote a lower screw hole.

In the shaft-one-end fixed type fluid dynamic pressure bearing of FIG. 18, the lubrication oil 18 filled within the fine gaps 5, 17a, 17b and 17c is in contact with the air at the tapered opening 11. However, the filled lubrication oil 18 is prevented from leaking to an outside of the fine gap by the presence of a capillary seal and surface tension in this opening. In particular, the fine gaps 17a, 17b and 17c constitute a closed end.

The filled lubrication oil 18 is made difficult to leak out through the opening 11 due to a fine gap structure having the closed end, i.e. a fine gap structure with one-side closure. In the shaft-both-end fixed type fluid dynamic pressure bearing of FIG. 19, on the other hand, the filled lubrication oil 18 filled within the fine gaps 5a, 5b, 17a, 17b and 17c is in contact with the air at the tapered upper opening 11a and lower opening 11b. However, the filled lubrication oil 18 is prevented from leaking out of the fine gaps by the presence of a capillary seal and surface tension given by the openings.

Of the above related-art apparatus, the shaft-one-end fixed type fluid dynamic pressure bearing of FIG. 18 has a closed end formed in the fine gaps. Accordingly, even if the apparatus is tilted, the lubrication oil does not easily leak out. Thus, the apparatus is excellent in sealability. However, there is a disadvantage in that the shaft 1 is fixed at only one lower end point and hence may undergo precession motion during rotation at high speed, resulting in unstable rotation. Conversely, the shaft-both-end fixed type dynamic pressure bearing of FIG. 19 fixes the shaft 1 at its both ends and hence will not undergo precession motion during rotation at high speed, thus offering stable rotation. However, there is a problem in that the fine gaps are opened to the air at upper and lower sides, resulting in insufficient of sealability. Even if the surface tension is increased by providing an air reservoir within a fine gap between the upper and lower radial dynamic pressure producing grooves 8a and 8b, the surface tension is abruptly decreased upon tilting and horizontally positioning the fluid dynamic pressure bearing. Furthermore, if in this state temperature change or external impact is applied, the lubrication oil filled within the fine gap may readily leak out.

SUMMARY OF THE INVENTION

It is therefore an object of the present invention to maintain, in a shaft-both-end fixed type fluid dynamic bearing, a high sealability not only during rotation at high speed but even upon tilting in a standstill state.

It is a second object of the invention to provide, in a shaft-both-end fixed type fluid dynamic pressure bearing, a capability of supporting greater load weight as compared to the related art apparatus.

It is a third object of the invention to provide a spindle motor which can maintain stability in high speed rotation while supporting large load weight.

It is a fourth object of the invention to provide a rotary apparatus which can rotationally drive as many as five or more hard discs.

In brief, the present invention is a double sleeve type fluid dynamic pressure bearing, comprising: a fixed shaft having respective ends to be fixed to a utilized apparatus; a rotary sleeve arranged to provide a first fine gap between an inner peripheral surface thereof and an outer peripheral surface of the fixed shaft; a fixed sleeve arranged to provide a second fine gap between an inner peripheral surface thereof and an outer peripheral surface of the rotary sleeve; a holder member arranged to cooperate with a lower end surface of the rotary sleeve to provide a third fine gap; and wherein the first fine gap and the second fine gap are formed with radial dynamic pressure producing grooves while the third fine gap is formed with a thrust dynamic pressure producing groove, the first, second and third fine gaps being filled with lubrication oil; the first fine gap and the second fine gap having one end serving as an opening end contacting with the air and the other end serving as an closed end communicated with each other through the third fine gap.

In the double sleeve type fluid dynamic pressure bearing, the radial dynamic pressure producing grooves are provided in the first fine gap and a drawing groove is in the second fine groove so as not to interfere with the dynamic pressure producing grooves so that a drawing force is caused exceeding a centrifugal force to prevent lubrication oil from leaking out. Also, in the double sleeve type dynamic pressure bearing, a capillary seal is provided in one or both of the opening ends of the first fine gap and the second fine gap, and an auxiliary seal of a fluid reservoir type is provided in position of a fine gap close to a minimum groove width portion of the capillary seal portion.

Also, the present invention is, in a spindle motor structured by a rotor including a rotor magnet, a stator including a stator coil and a fluid dynamic pressure bearing rotatably supporting the rotor to the stator, the spindle motor adopting the double sleeve type fluid dynamic pressure bearing as the fluid dynamic pressure bearing. The invention is furthermore a rotary apparatus having as a drive source a spindle motor structured by a rotor including a rotor magnet, a stator including a stator coil and a fluid dynamic pressure bearing rotatably supporting the rotor to the stator.

BEST MODE FOR PRACTICING THE INVENTION

Figure 1:
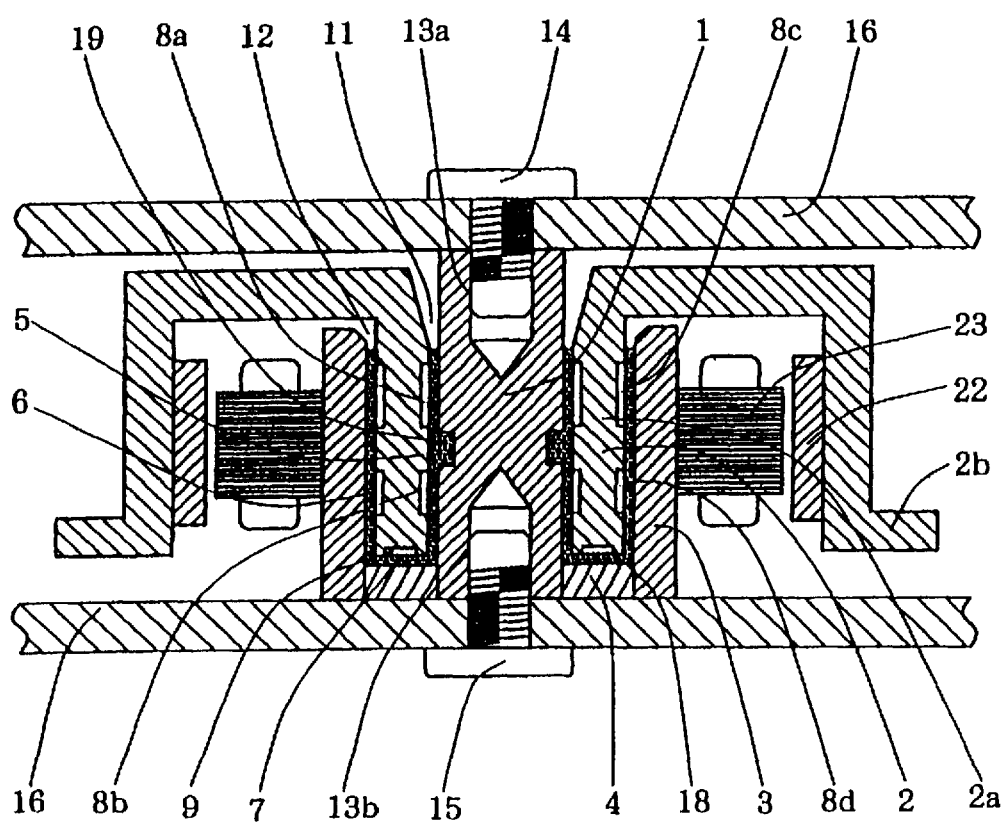
FIG. 1 is a sectional view of a spindle motor having a first embodiment of a fluid dynamic pressure bearing according to the present invention.

Referring to FIG. 1, there is shown a sectional view of a fluid dynamic pressure bearing of a shaft-both-end fixed type having a double sleeve structure according to the present invention, and a spindle motor having the same fluid dynamic pressure bearing. In FIG. 1, the fluid dynamic pressure bearing is structured by comprising a fixed shaft 1 having both ends fixed to a utilized apparatus such as an HDD, a rotary sleeve 2 having a first fine gap 5 provided cooperatively with the fixed shaft 1, a fixed sleeve 3 having a second fine gap 6 provided cooperatively with the rotary sleeve 2, and a disc-shaped holder member 4 having a third fine gap 7 provided cooperatively with a lower end surface of the rotary sleeve 2.

The fixed shaft 1 is formed with screw holes 13a and 13b at respective ends. The fixed shaft 1 is firmly fixed to a chassis 16 of a utilized apparatus such as an HDD apparatus through screws 14 and 15 screwed to the screw holes 13a and 13b. The rotary sleeve 2 is a member formed by a sleeve portion 2a having inner and outer peripheral surfaces, a cup-like hub 2b for holding a rotary member such as a disc, and a disc-formed extended portion 2c for firmly fixing the cup-like hub 2b to an upper end of the sleeve 2a. The disc-formed extended portion 2c is a portion in a disc form that is horizontally radially outwardly extended from an upper end of a sleeve portion 2a of the rotary sleeve 2, and formed integral with the sleeve 2a. The cup-like hub 2b serves also as a rotor member for the spindle motor and has a rotor magnet 22 mounted on an inner peripheral surface thereof. The fixed sleeve 3 is a member arranged standing on the base plate of the bearing or spindle motor. In an apparatus like the FIG. 1 embodiment without using a fixed base, the rotary sleeve 3 is provided standing adjacent the holder member 4 with its inner peripheral surface affixed in a liquid-tight manner to an outer peripheral surface of the disc-like holder member 4 which is coaxially fixed to the fixed shaft 1. The fixed sleeve 3 serves also as a stator member for the spindle motor, and has a stator coil 23 mounted on an outer peripheral surface thereof A tapered opening 11 is provided at a top end of a first fine gap 5 formed given between an outer peripheral surface of the fixed shaft 1 and an inner peripheral surface of the rotary sleeve 2. Similarly, a tapered opening 12 is also provided at a top end of a second fine gap 6 formed given between an outer peripheral surface of the rotary fixed sleeve 2 and an inner peripheral surface of the fixed sleeve 3. A third fine gap 7 is provided between an lower end surface of the rotary sleeve 2 and an upper surface of the disc-like holder member 4, which has one end communicated with a lower end of the first fine gap 5 and the other end communicated with a lower end of the second fine gap 6. In brief, the third fine gap 7 serves as a closed end with respect to the openings 11 and 12. Lubrication oil 18 is filled within the first fine gap 5, second fine gap 6 and third fine gap 7.

Figure 15:
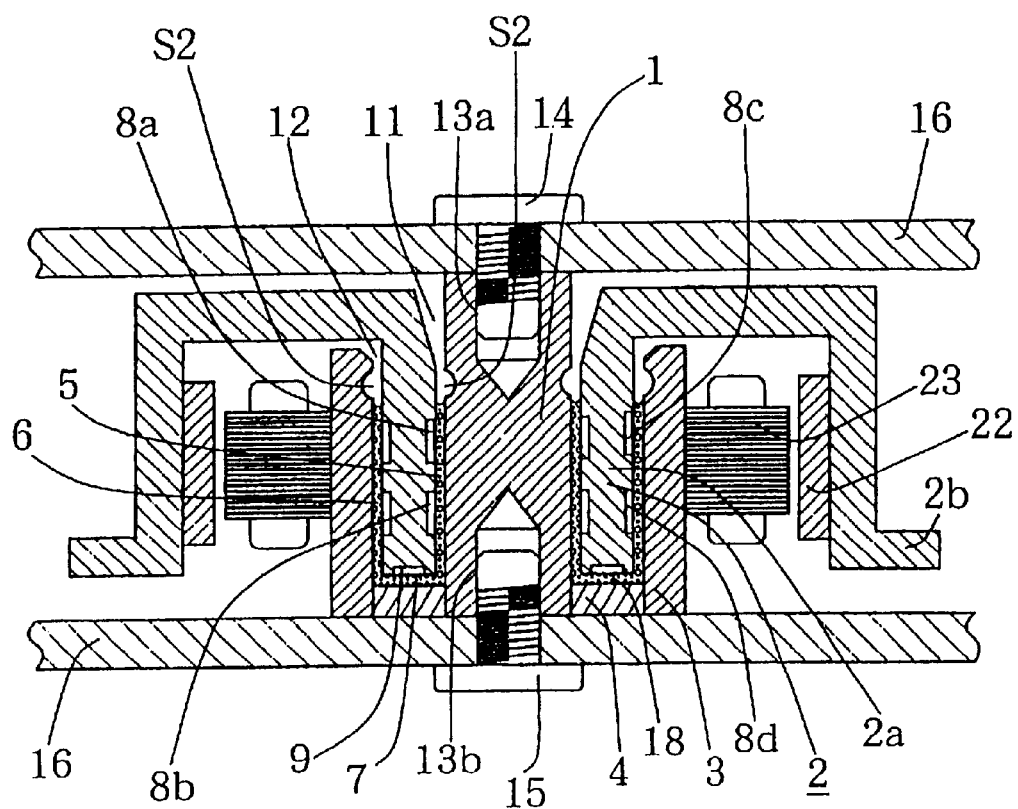
FIG. 15 is a sectional view of a spindle motor having a seventh embodiment of a fluid dynamic pressure bearing of the present invention.

The fin e gap, although exaggeratedly shown in FIGS. 1, 15 actually a fine gap with a size of approximately 5 to 500 μm Accordingly, the lubrication oil 18 has its liquid levels respectively kept at bottom portions of the tapered openings 11 and 12 by a surface tension and capillary phenomenon, being prevented from leaking out in usual state of usage. Moreover, the first fine gap 5 and the second fine gap 6 at their lower ends are communicated through the third fine gap 7, forming a closed end. Accordingly, even where the fluid dynamic pressure bearing of the invention is tilted, the lubrication oil 18 filled within these fine gaps hardly leaks.

In the present invention, radial dynamic pressure producing grooves 8a and 8b are provided in the first fine gap while radial dynamic pressure producing grooves 8c and 8d are in the second fine gap 6. A thrust dynamic pressure producing groove 9 is provided in the third fine gap 7. Explained will be on which wall surface these dynamic pressure producing grooves are formed, with reference to FIG. 2 to FIG. 6.

Figure 2:
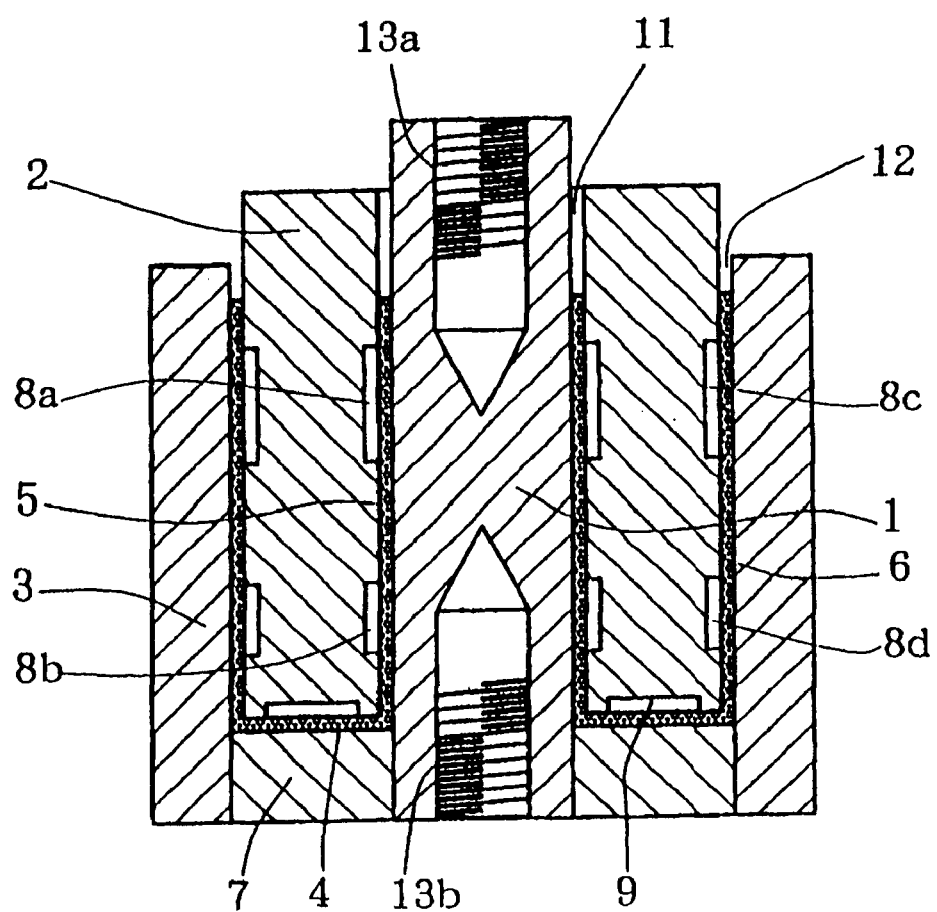
FIG. 2 is a sectional view of a second embodiment of a fluid dynamic pressure bearing of the present invention.

First, in a shaft-both-end fixed type fluid dynamic pressure bearing of a second embodiment of FIG. 2, radial dynamic pressure producing grooves 8a and 8b are formed in an inner peripheral surface of the rotary sleeve 2, while radial dynamic pressure producing grooves 8c and 8d are formed in an outer peripheral surface of the rotary sleeve 2.

Figure 3:
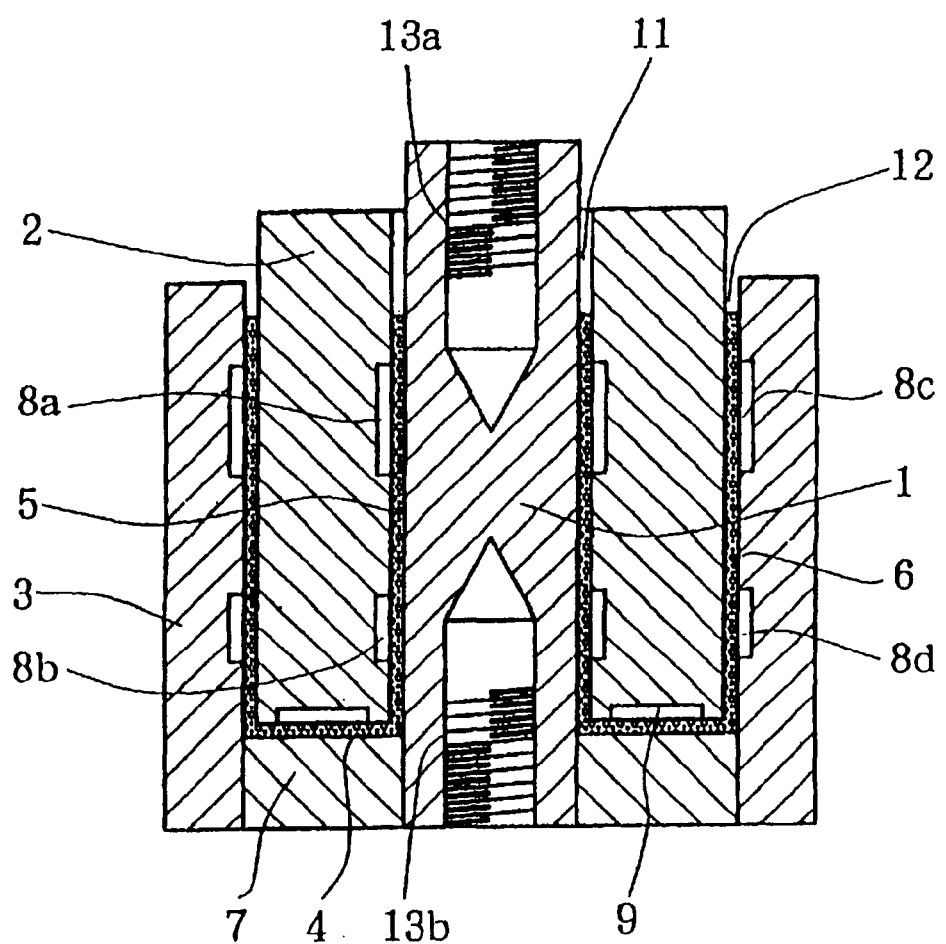
FIG. 3 is a sectional view of a third embodiment of a fluid dynamic pressure bearing of the present invention.

Next, in a shaft-both-end fixed type fluid dynamic pressure bearing of a third embodiment of FIG. 3, radial dynamic pressure producing grooves 8a and 8b are formed in an inner peripheral surface of the rotary sleeve 2, while radial dynamic pressure producing grooves 8c and 8d are formed in an inner peripheral surface of the fixed sleeve 3.

Figure 4:
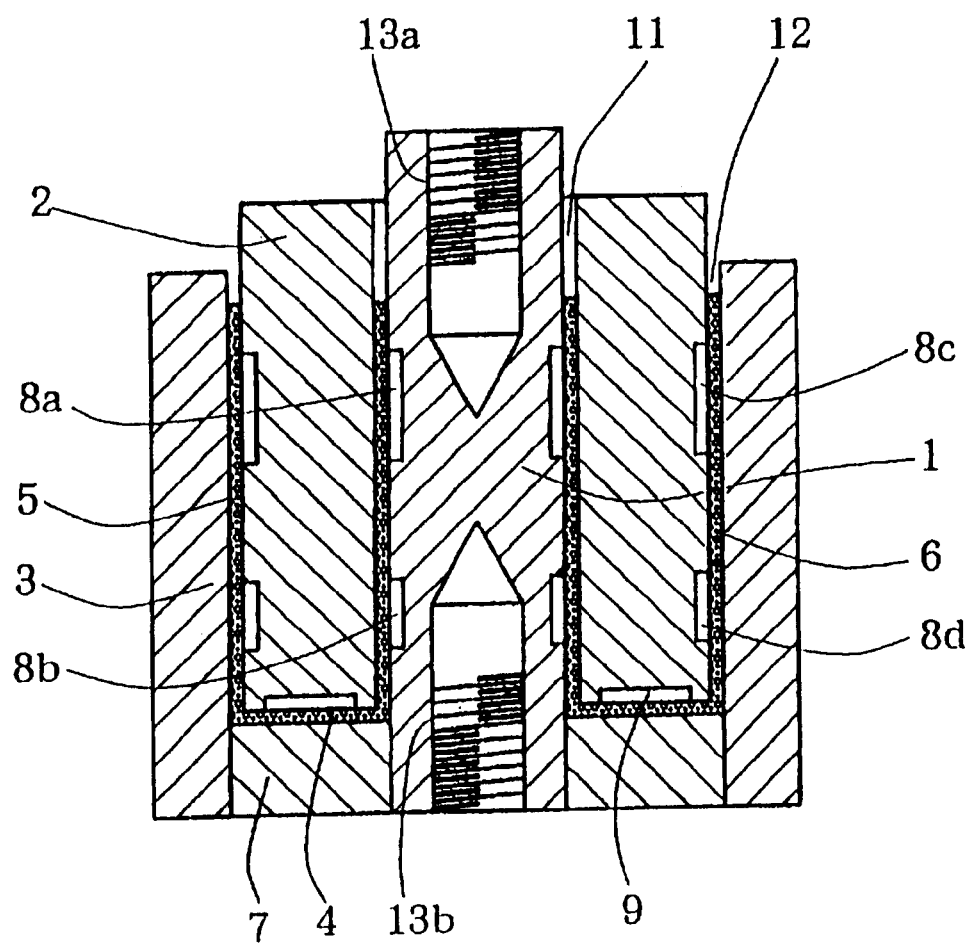
FIG. 4 is a sectional view of a fourth embodiment of a fluid dynamic pressure bearing of the present invention.

Meanwhile, in shaft a both end fixed type fluid dynamic pressure bearing of a fourth embodiment of FIG. 4, radial dynamic pressure producing grooves 8a and 8b are formed in an outer peripheral surface of the fixed shaft 1, while radial dynamic pressure producing grooves 8c and 8d are formed in an outer peripheral surface of the rotary sleeve 2.

Figure 5:
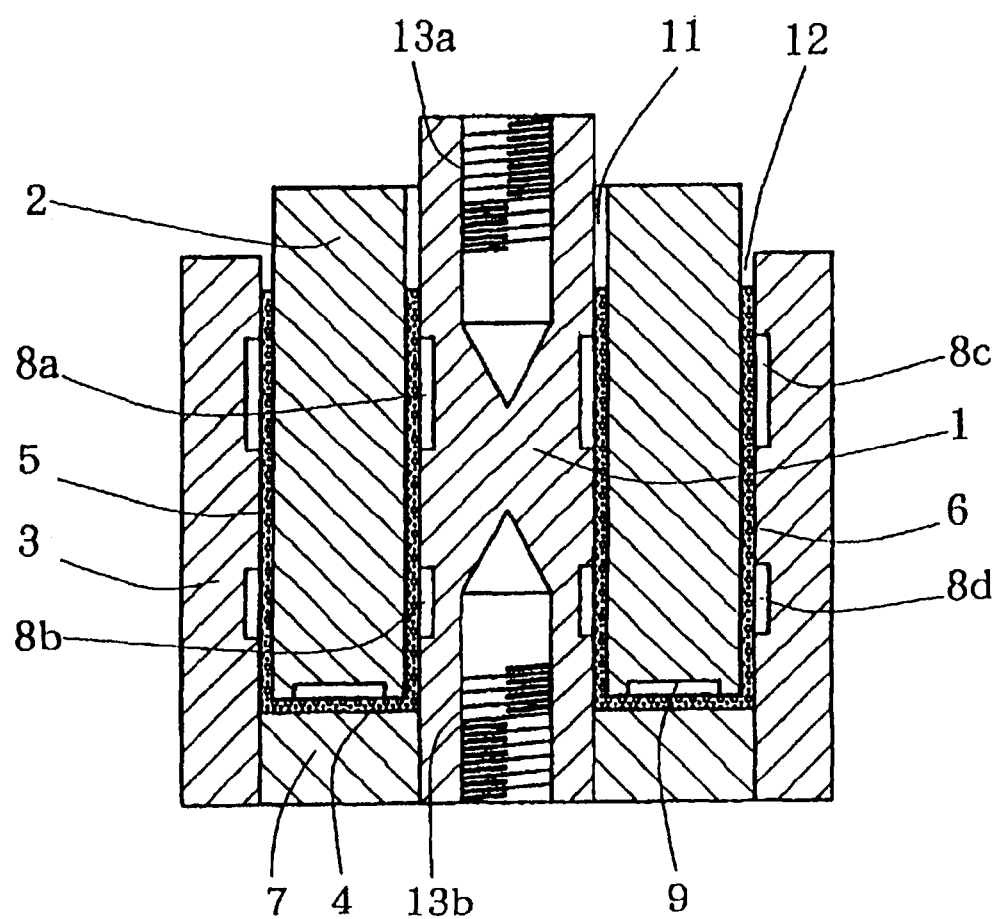
FIG. 5 is a sectional view of a fifth embodiment of a fluid dynamic pressure bearing of the present invention.

Furthermore, in a shaft-both-shaft both end fixed type fluid dynamic pressure bearing of a fifth embodiment of FIG. 5, radial dynamic pressure producing grooves 8a and 8b are formed in an outer peripheral surface of the fixed shaft 1, while radial dynamic pressure producing grooves 8c and 8d are formed in an inner peripheral surface of the fixed sleeve 3.

Figure 6:
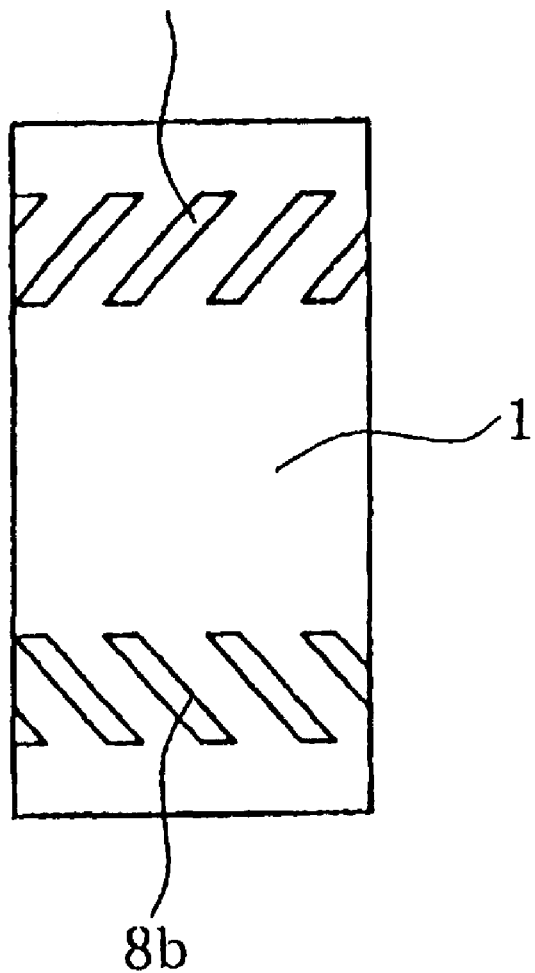
FIG. 6 shows a first example of a radial dynamic pressure producing groove.
Figure 7:
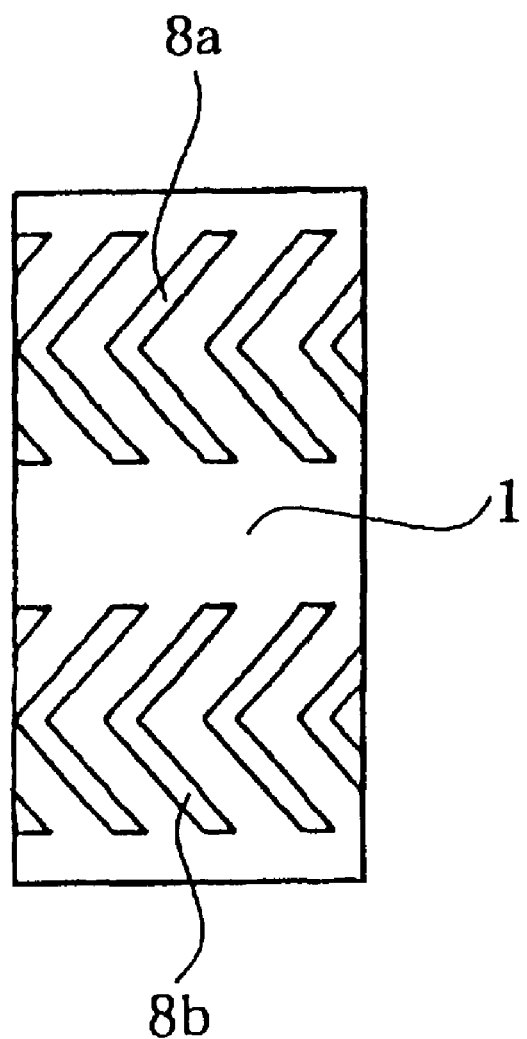
FIG. 7 shows a second example of a radial dynamic pressure producing groove.
Figure 8:
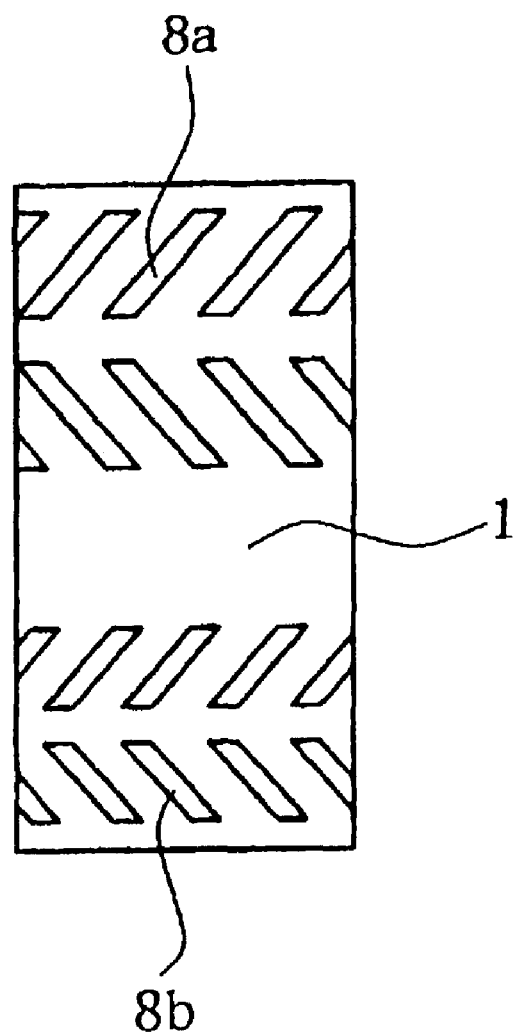
FIG. 8 shows a third example of a radial dynamic pressure producing groove.
Figure 9:
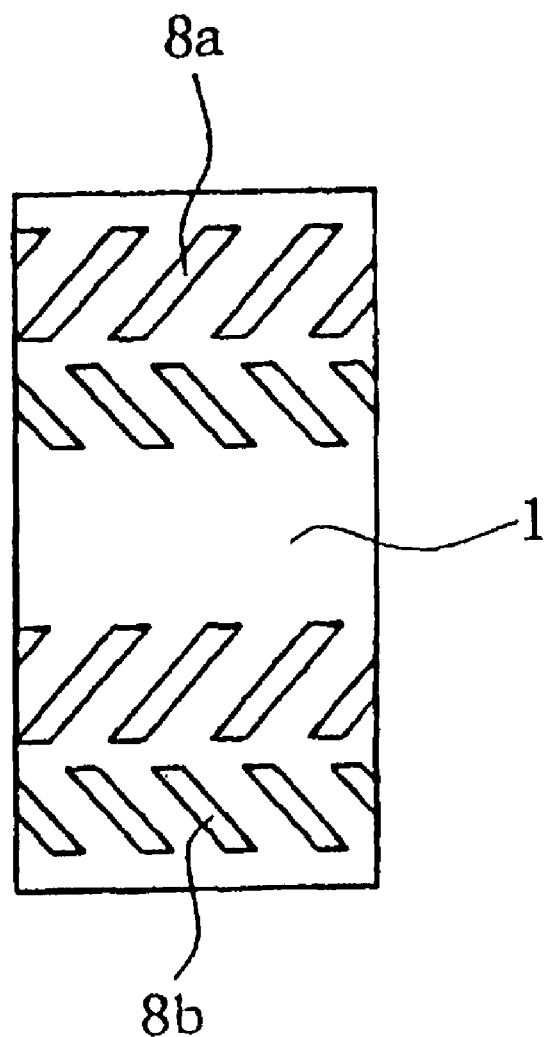
FIG. 9 shows a fourth example of a radial dynamic pressure producing groove.

The radial dynamic pressure producing grooves 8a and 8b are formed by partial grooves as shown in FIG. 6 or herringbone groove as shown in FIG. 7 to FIG. 9. As for herringbone grooves, groove length and depth are adjusted such that the upper side grooves 8a can cause greater dynamic pressure than the lower side grooves 8b. This provides net lubrication flow in a direction toward the closed end of the fine gap. Accordingly, no leak of lubrication oil 18 occurs through the openings 11 and 12 even upon abrupt temperature change or heavy impact.

Figure 10:
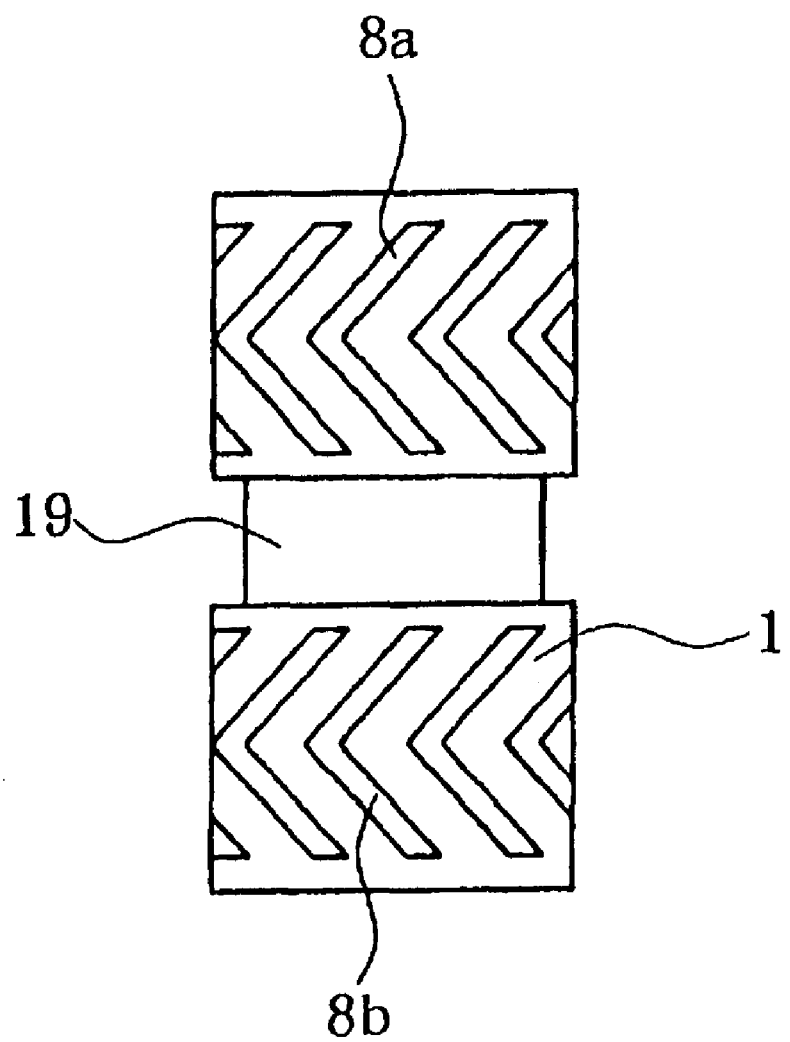
FIG. 10 is an essential part side view of a fixed shaft formed with a radial dynamic pressure producing groove and lubrication oil reservoir.

For prevention against leak of lubrication oil 18, it is further effective to provide a lubrication oil reservoir 19 in the first fine gap having the radial dynamic pressure producing grooves, as shown in FIG. 1. The lubrication oil reservoir 19 is not limited to the provision on the outer peripheral surface of the fixed shaft 1 as shown in FIG. 1 but may be provided in the inner and outer peripheral surfaces of the cylindrical sleeve 2 or in an inner peripheral surface of the fixed cylindrical sleeve 3. Alternatively, the reservoir 19 may be formed in the fixed shaft 1 as shown in FIG. 10. It is noted that the lubrication oil reservoir 19 is provided between the upper and lower radial dynamic pressure producing grooves. The lubrication oil reservoir 19 acts to smoothen lubrication oil 18 flow at high speed rotation, and to enhance a lubrication oil leak prevention effect by increasing the surface tension of lubrication oil at standstill.

Figure 11:
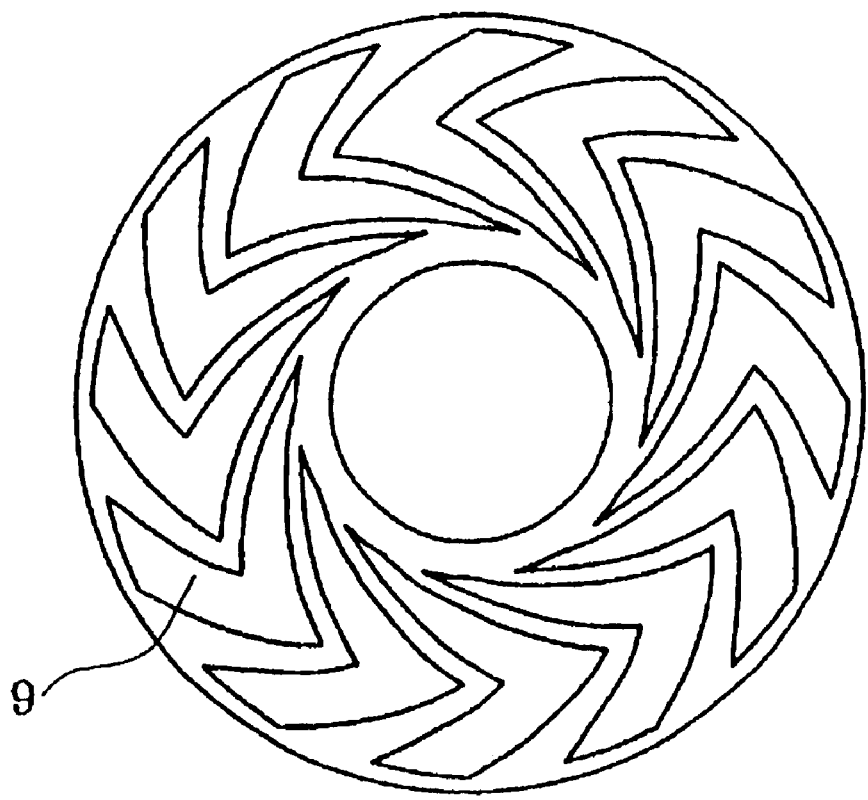
FIG. 11 shows one example of a thrust dynamic pressure producing groove.

The thrust dynamic pressure producing groove 9 is formed by a series of v-shaped or herringbone grooves arranged annularly as shown in FIG. 11, which in the present invention is provided in the third fine gap 7. The thrust dynamic pressure producing groove 9 in FIG. 2 to FIG. 5 is provided in the lower end face of the rotary sleeve 2 but not limited to such a structure. It may be provided in the upper surface of the disc-like holder member 4.

The spindle motor thus constructed, when supplied by an energizing current to its stator coil 23, is rotated due to electromagnetic action between the rotor magnet 22 and magnetic field. Thereupon, a first radial pressure is caused in the first fine gap 5 due to the radial dynamic pressure producing grooves 8a and 8b, while a second radial dynamic pressure is caused in the second fine gap 6 due to the radial dynamic pressure producing grooves 8c and 8d. Further, in the third fine gap 7 a thrust dynamic pressure is caused due to the thrust dynamic pressure producing groove 9. The spindle motor supports a rotary member, such as a hard disc, through these dynamic pressures, maintaining smooth rotation at high speed.

As will be apparent from the above, the fluid dynamic pressure bearing of the invention has the second fine gap 6 arranged on an outer side of the first fine gap 5 so that a first radial dynamic pressure can be caused in the first fine gap 5 while a second radial dynamic pressure in the second fine gap 6. This greatly increases radial dynamic pressure to support a load weight as compared to the related art fluid dynamic pressure bearing.

A spindle motor adopting a fluid dynamic pressure bearing capable of producing such a high dynamic pressure and stable operation at high speed rotation could realize stable rotation at high speed while supporting a high load weight. Hence, a rotary apparatus having the inventive spindle motor as a rotary member drive source is applicable for great load weight applications. For a large capacity HDD apparatus for example, as many as five or more hard discs can be rotated smoothly at high speed.

Incidentally, the present invention is not limited to the shaft-both-end fixed type fluid dynamic pressure bearing of the double sleeve type as shown in FIG. 1, i.e. the fluid dynamic pressure bearing structured adopting a columnar member as the fixed shaft 1, and cylindrical members as the rotary shaft 2 and fixed sleeve 3, respectively. The invention is applicable also to various double sleeve structured shaft-both-end fixed type fluid dynamic pressure bearings. First, in a double sleeve structured shaft both end fixed type fluid dynamic pressure bearing using a columnar member as a fixed shaft 1, its sleeve 2 may adopt various forms of members including, for example, deformed cylindrical member, deformed conical frustum member, conical frustum member, semi-spherical-portion-having member, deformed semi-spherical member, and disc-like member. The difference in rotary sleeve 2 shape naturally results in different fixed sleeve shape in a corresponding fashion. Accordingly, those using a columnar member as the fixed shaft 1 includes various double sleeve structured shaft-both-end fixed type fluid dynamic pressure bearings according to the rotary sleeve shape.

Meanwhile, there is a double sleeve structured shaft-both-end fixed type fluid dynamic pressure bearing adopting a member in shape other than circular column as the fixed shaft 1. For example, a fluid dynamic pressure bearing structured by respectively adopting a columnar member having upper and lower larger diameter portions as the fixed shaft 1, a member having an inner peripheral surface to form a first fine gap 5 cooperatively with an outer peripheral surface of the fixed shaft 1 as the rotary sleeve 2, and a cylindrical member as the fixed sleeve 3; and a fluid dynamic pressure bearing structured by respectively adopting a columnar member having a smaller diameter portion at its intermediate position as the fixed shaft 1, a member having an inner peripheral surface to form a first fine gap 5 cooperatively with an outer peripheral surface of the fixed shaft 1 as the rotary sleeve 2, and a cylindrical member as the fixed sleeve 3.

Now explanations will be made of other embodiments of lubrication oil leak preventing means to be adopted in the double sleeve type fluid dynamic pressure bearing of the invention, with reference to FIG. 12 to FIG. 14.

Figure 12:
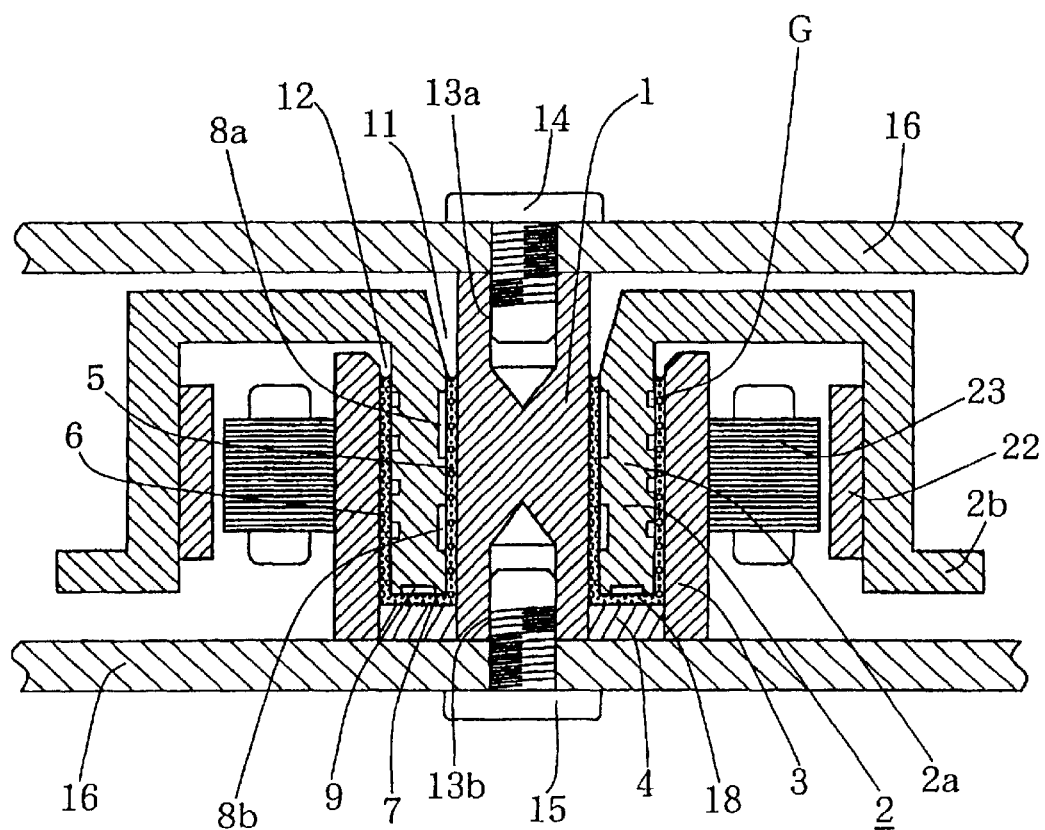
FIG. 12 is a sectional view of a spindle motor having a sixth embodiment of a fluid dynamic pressure bearing of the present invention.

Referring to FIG. 12, a sectional view of a spindle motor is shown having a sixth embodiment of a fluid dynamic pressure bearing of the invention. The fluid dynamic pressure bearing shown in FIG. 12 has the same basic structure as the fluid dynamic pressure bearing of FIG. 1 but is different in its lubrication oil leak preventing means. That is, the fluid dynamic pressure bearing shown in FIG. 1 has capillary seals respectively provided at the opening ends of the first and second fine gaps 5 and 6, and a lubrication oil reservoir 19 provided in the first fine gap 5 thereby preventing leak of lubrication oil. On the contrary, the fluid dynamic pressure bearing shown in FIG. 12 has capillary seals respectively provided at the opening ends of the first and second fine gaps, and a drawing groove G formed in an outer peripheral surface of the rotary sleeve 2 thereby preventing leak of lubrication oil. The drawing groove G serves to draw lubrication oil 18 to the inside of the second fine gap 6 due to rotation of the rotary sleeve 2.

Figure 13:
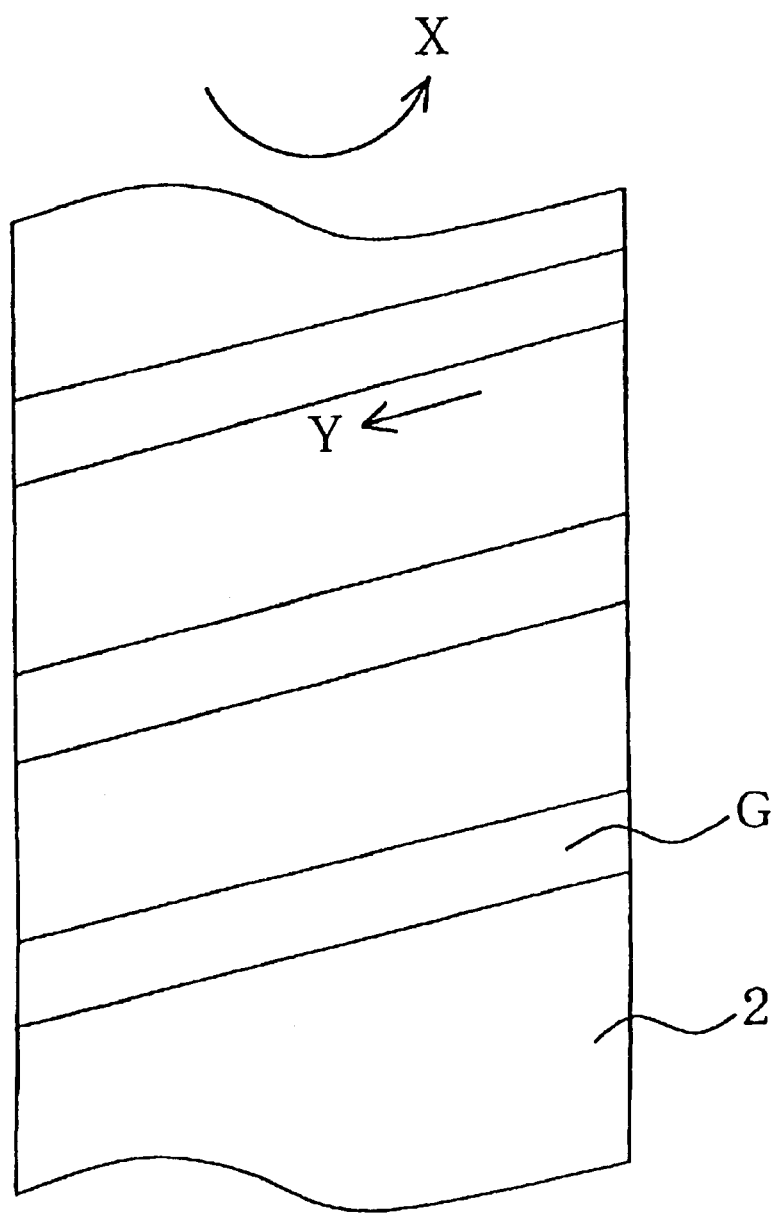
FIG. 13 is a partially magnified view including a drawing groove.

The drawing groove G is, as shown for example in FIG. 13, a plurality of helical grooves formed in an outer peripheral surface of the rotary sleeve 2 in a direction of from upper right to lower left in the figure by a proper means, such as cutting, pressure-inscription or etching. The rotation of the rotary sleeve 2 in a direction of the arrow X causes lubrication oil 18 to move at high speed in a direction of the arrow Y through the action of the drawing groove G helically formed with directionality as above. Consequently, the provision of the drawing groove G in the second fine gap 6 causes a drawing force exceeding a centrifugal force due to rotation of the rotary sleeve 2. Thus, lubrication oil 18 is drawn into the second fine gap 6 to thereby prevent lubrication oil from leaking out during rotation.

Figure 14:
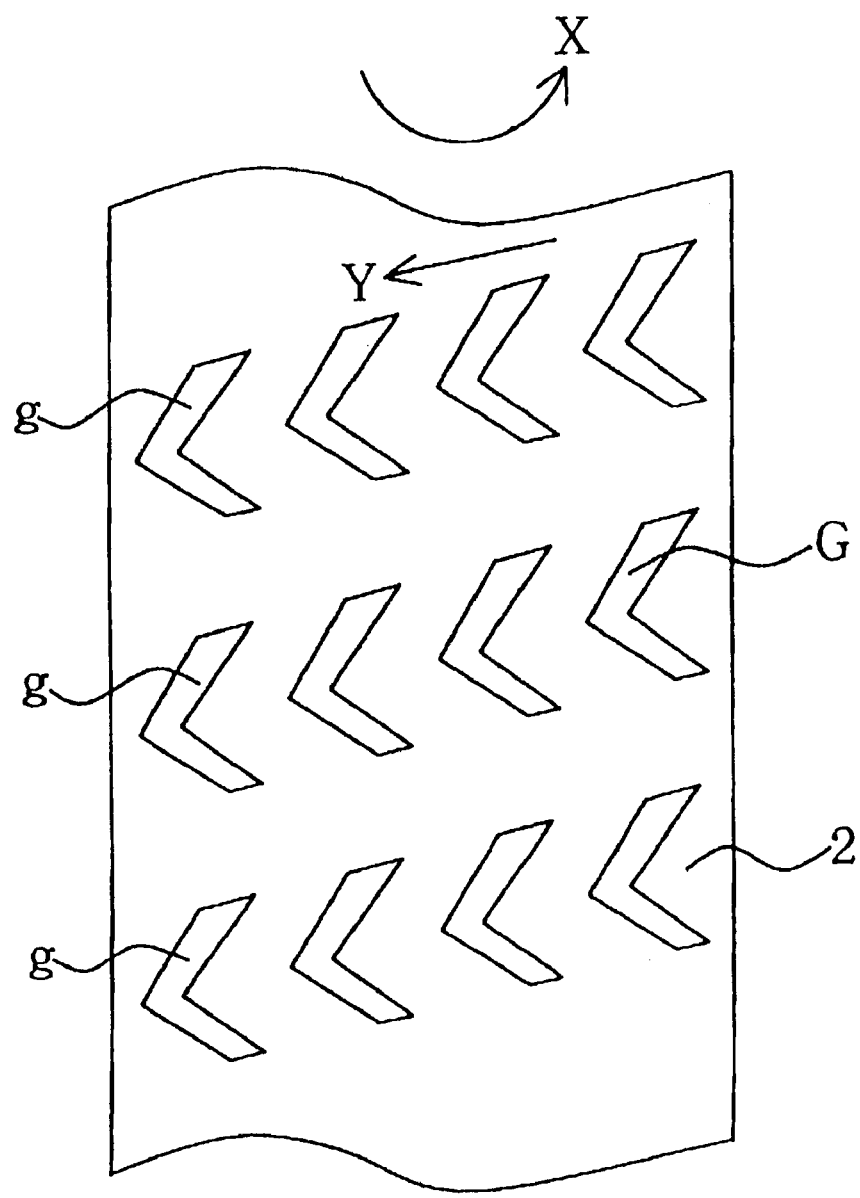
FIG. 14 is a partially magnified view including a modification to the drawing groove.

Referring to FIG. 14, there is shown a modification of a drawing groove G. The drawing groove G of FIG. 14 is structured by a plurality of groups of V-shaped grooves, or so-called herringbone type drawing grooves. Each V-shaped groove group includes a plurality of V-shaped grooves, or helically arranged on an outer peripheral surface of a rotary sleeve 2 in a direction from the upper right to the lower left in the figure. Accordingly, the provision of the drawing groove G of FIG. 14 in the second fine gap 6 causes a drawing force greater than a centrifugal force caused by the rotation of the rotary sleeve 2. Thus, lubrication oil 18 is drawn into the second fine gap 6 thereby preventing lubrication oil from leaking out during rotation.

It was shown in FIG. 12 to FIG. 14 that the radial dynamic pressure producing groove is provided in the first fine gap 5 while the drawing groove G is arranged in the second fine groove 6. However, they may be arranged conversely to the above. That is, the radial dynamic pressure producing groove may be provided in the second fine gap 6 and the drawing groove G may be provided in the first fine gap 5. Both the radial producing groove and the drawing groove may be arranged in the same fine gap.

It will be appreciated that the drawing groove G should be arranged in such a position that its lubrication oil drawing function does not interfere with a dynamic pressure producing action by the dynamic pressure producing groove. Although the drawing groove G is formed in an outer peripheral surface of the rotary sleeve 2 forming the second fine gap 6, it may be formed in an inner peripheral surface of the fixed sleeve 3 also forming the second fine gap 6. In brief, the drawing groove G is formed at least one of a pair of wall surfaces forming the fine gap where the drawing gap G is to be arranged.

Figure 16:
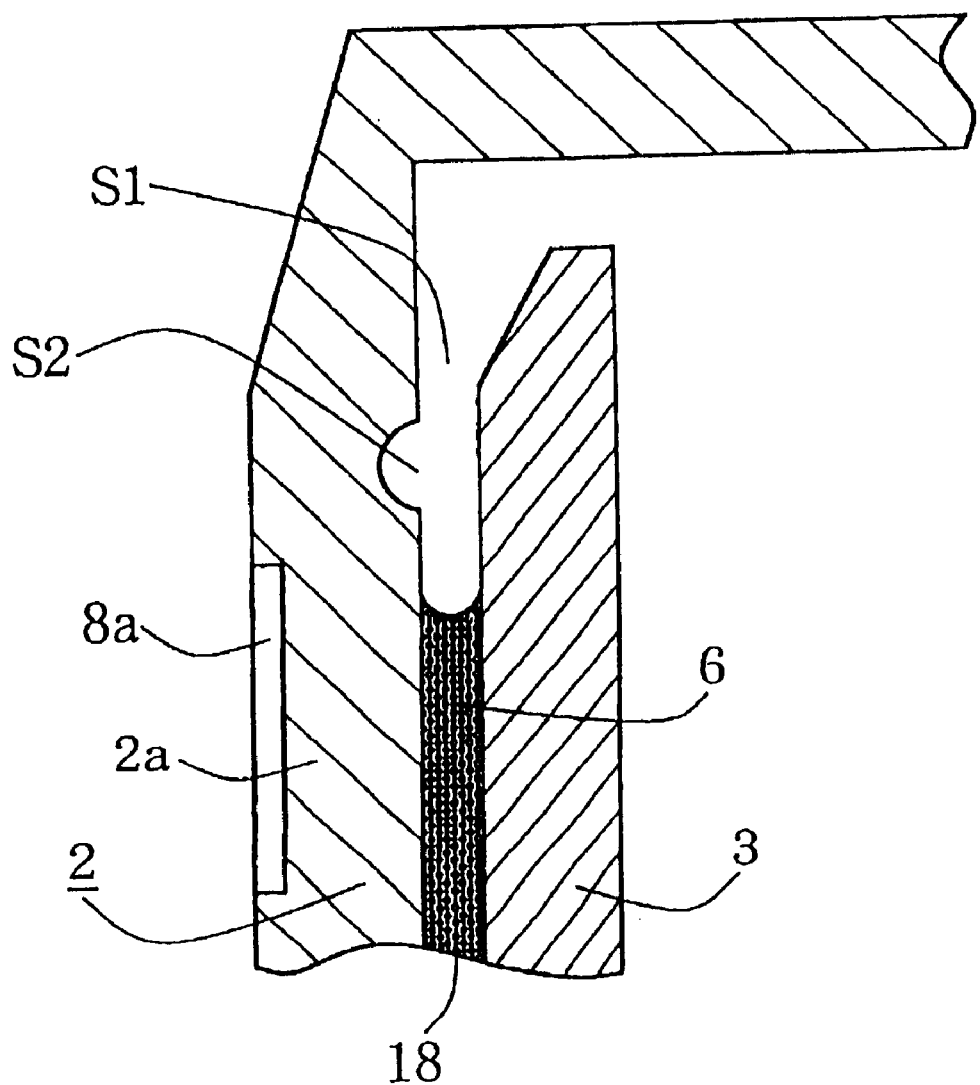
FIG. 16 is a partially magnified view of a second fine gap including an auxiliary seal.

A still another embodiment of a lubrication oil leak preventing means will be described with reference to FIG. 15 to FIG. 17, which is to be adopted by the double sleeve type fluid dynamic pressure bearing of the invention.

Referring to FIG. 15, there is shown a sectional view of a spindle motor provided with a seventh embodiment of a fluid dynamic pressure bearing of the invention. The fluid dynamic pressure bearing of FIG. 15 has the a same basic structure as the fluid dynamic pressure bearing of FIG. 1 but different in its lubrication oil leak preventing means. That is, in the fluid dynamic pressure bearing of FIG. 1 capillary seals are provided at respective opening end of a first fine gap 5 and a second fine gap 6 and further a lubrication oil reservoir 19 is provided in the first fine gap 5 thereby preventing leak of lubrication oil. Contrary to this, the fluid dynamic pressure bearing of FIG. 15 has capillary seals provided at respective opening ends of a first fine gap 5 and a second fine gap 6, and wherein a double seal structure is adopted that a fluid reservoir type auxiliary seal S2 are provided close to a minimum groove width portion of the capillary seal. With such a structure, the lubrication oil 18 that is to leak out, when vibrated or positioned side up, is caught by the auxiliary seal S2 before reaching the capillary seal S1. Thus, the lubrication oil is prevented from leaking out.

The fluid reservoir type auxiliary seal S2 is realized by an annular groove formed in one of a pair of opposed wall surfaces forming the fine gap. For example, the auxiliary seal S2 is formed sectionally in a semi-circular annular groove in an outer peripheral surface of the rotary sleeve 2 providing the second fine gap 6, as shown in FIG. 16. The annular auxiliary seal S2 semi-circular in section may be formed in an inner peripheral surface of the fixed sleeve 3 forming the second fine gap 6.

Figure 17:
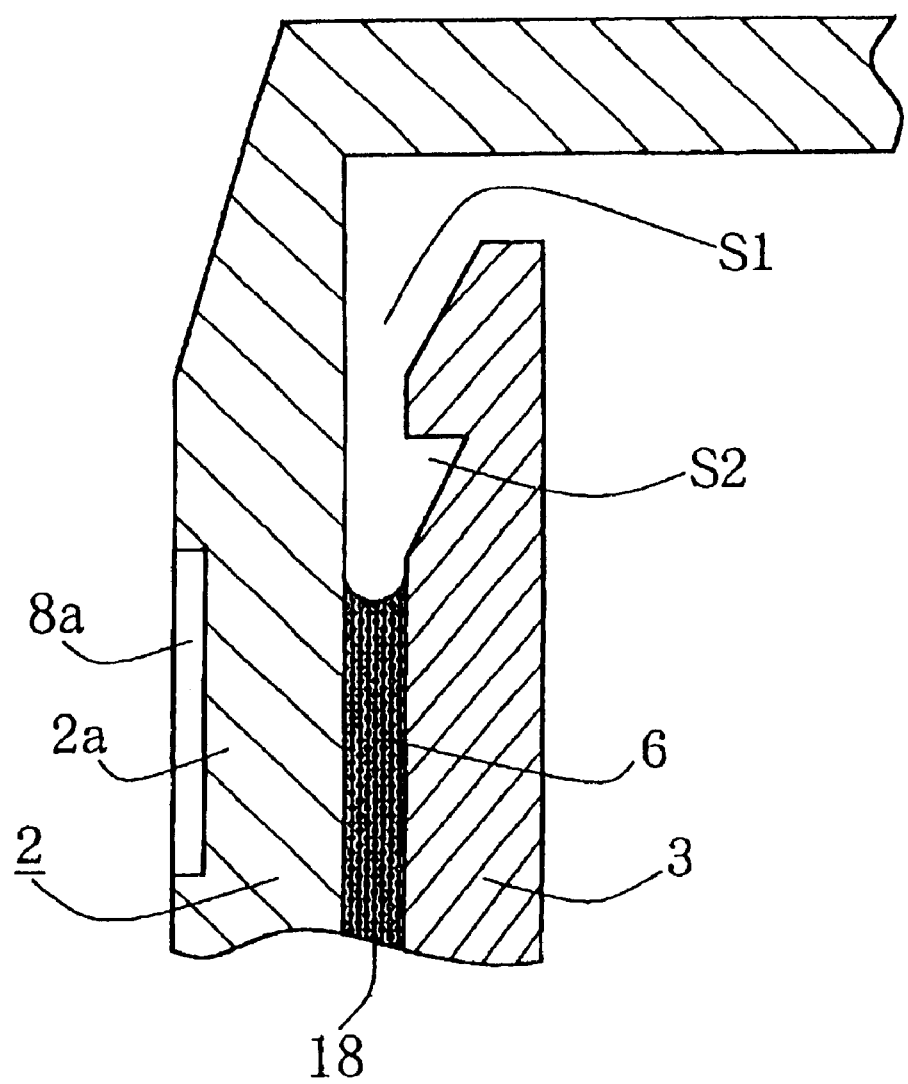
FIG. 17 is a partially magnified view of a second fine gap including a modification to the auxiliary seal.
Figure 18:
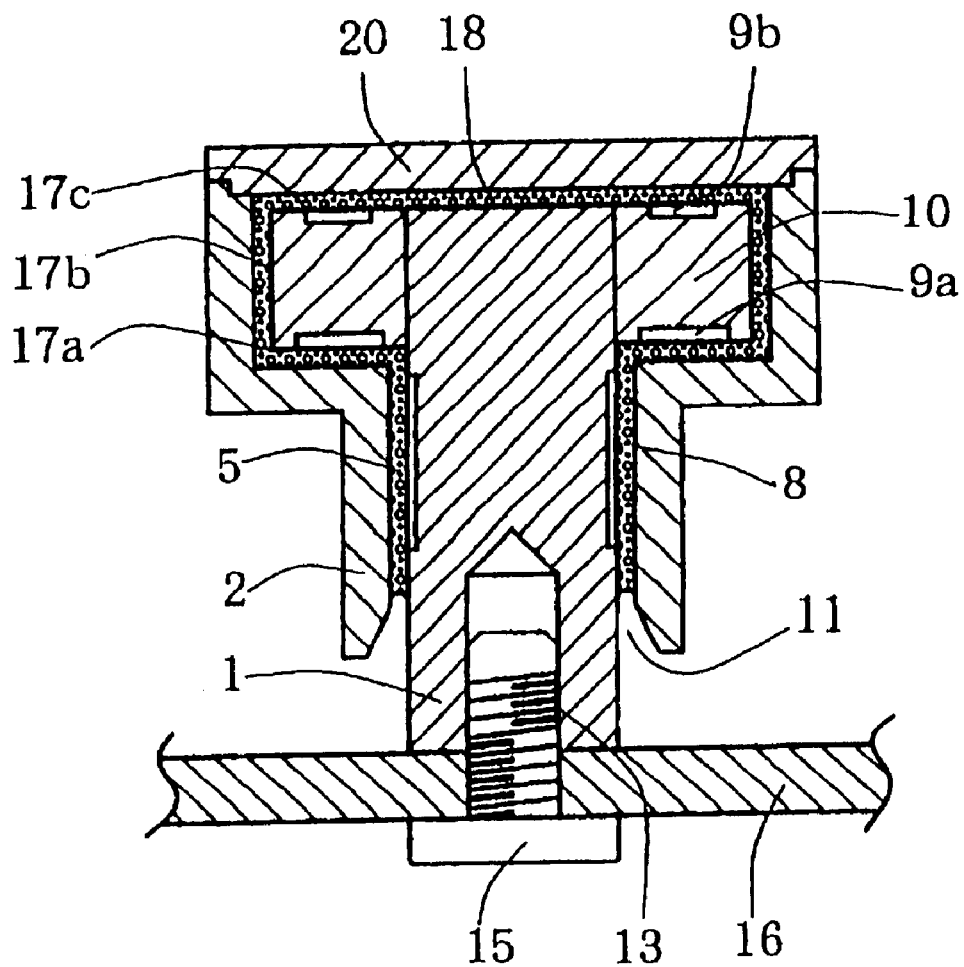
FIG. 18 is a sectional view of a related art shaft-one-end fixed type fluid dynamic pressure bearing.
Figure 19:
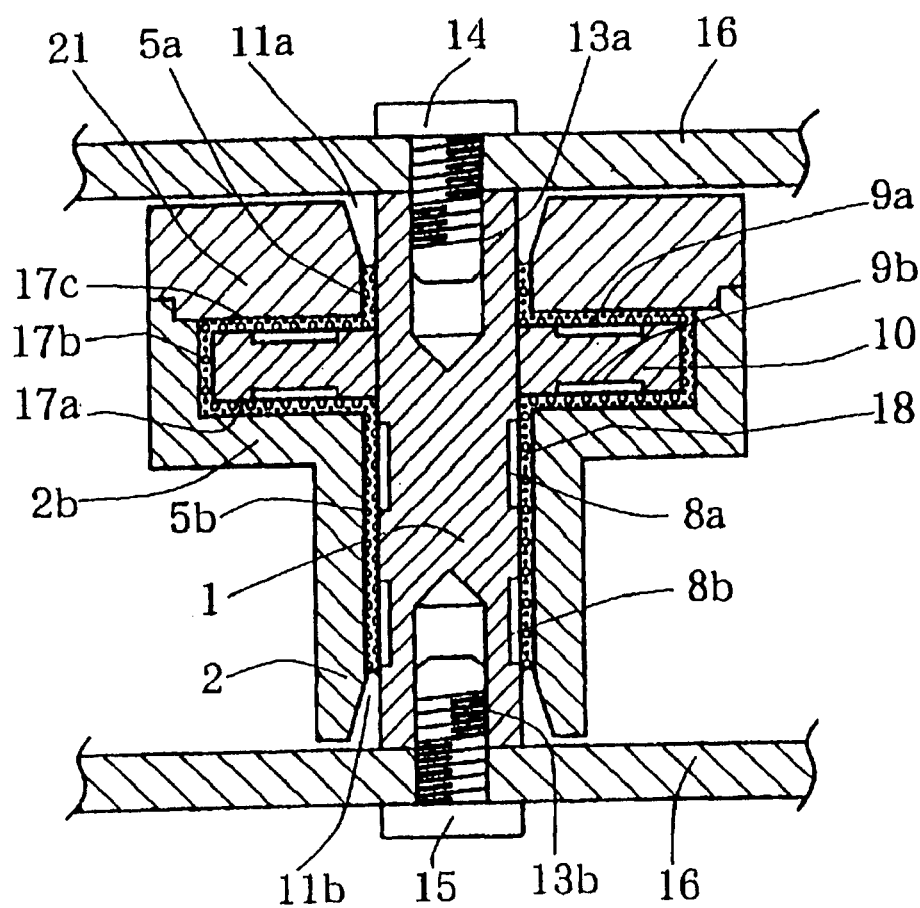
FIG. 19 is a sectional view of a related art shaft-both-end fixed type fluid dynamic pressure bearing.

The auxiliary seal S2 is formed as an annular groove substantially triangular in section in an inner peripheral surface of the fixed sleeve 3 forming the second fine gap 6, as shown in FIG. 17. The auxiliary annular grooved seal S2 substantially generally triangular in section may be formed in an outer peripheral surface of the rotary sleeve 2 forming the second fine gap 6. The auxiliary seal S2 as shown in FIG. 17 also functions as a capillary seal. Accordingly, in FIG. 17 is formed a lubrication oil leak prevention means of a two-stage capillary seal structure having the capillary seal S1 on an outer side and the auxiliary seal S2 on an inner side.

Although the present invention was explained above by way of various embodiments, the present invention is not limited in scope to these embodiments but should be construed by the inventions set forth in the appended claims and those their equivalencies.

What is claimed is:

1. A fluid dynamic pressure bearing, comprising:
   a fixed shaft having at least one of a pair of ends fixedly mountable to an apparatus;
   a rotary sleeve having an inner peripheral surface arranged adjacent to an outer peripheral surface of the fixed shaft to provide a first fine gap between the inner peripheral surface of the rotary sleeve and the outer peripheral surface of the fixed shaft;

a fixed sleeve having an inner peripheral surface arranged adjacent to an outer peripheral surface of the rotary sleeve to provide a second fine gap between the inner peripheral surface of the fixed sleeve and the outer peripheral surface of the rotary sleeve; and a holding member for holding the fixed shaft and the fixed sleeve arranged adjacent to a lower end surface of the rotary sleeve to provide a third fine gap between the holding member and the lower end surface of the rotary sleeve;

wherein at least one of the first fine gap and the second fine gap is formed with radial dynamic pressure producing grooves and the third fine gap is formed with a thrust dynamic pressure producing groove, and the first, second and third fine gaps are filled with a lubrication oil so that the rotary sleeve is supported to undergo rotational movement with respect to the fixed shaft and the fixed sleeve; and wherein the first fine gap and the second fine gap each have one open end which is in contact with air outside the bearing and one closed end which is not in contact with the air, and the closed ends of the first and second fine gaps are in communication with each other through the third fine gap.

2. A fluid dynamic pressure bearing according to claim 1; wherein the radial dynamic pressure producing grooves are formed in the inner peripheral surface and the outer peripheral surface of the rotary sleeve.

3. A fluid dynamic pressure bearing according to claim 1; wherein the radial dynamic pressure producing grooves are formed in the inner peripheral surface of the rotary sleeve and the inner peripheral surface of the fixed sleeve.

4. A fluid dynamic pressure bearing according to claim 1; wherein the radial dynamic pressure producing grooves are formed in the outer peripheral surface of the fixed shaft and the outer peripheral surface of the rotary sleeve.

5. A fluid dynamic pressure bearing according to claim 1; wherein the radial dynamic pressure producing grooves are formed in the outer peripheral surface of the fixed shaft and the inner peripheral surface of the fixed sleeve.

6. A fluid dynamic pressure bearing according to claim 1; further comprising a lubrication oil reservoir formed in one of the fine gaps, and the one of the fine gaps is also formed with a radial dynamic pressure producing groove.

7. A spindle motor having a rotor including a rotor magnet, a stator including a stator coil opposing the rotor magnet, And a bearing for rotatably supporting the rotor with respect to the stator so that excitation of the stator coil causes the rotor to undergo rotational movement; wherein the bearing comprises the fluid dynamic pressure bearing according to either one of claim 1 or claim 2.

8. A rotary apparatus having a drive source for driving a rotary member; wherein the drive source comprises the spindle motor according to claim 7.

9. A fluid dynamic pressure bearing according to claim 1; wherein the fixed shaft has a cylindrical shape.

10. A fluid dynamic pressure bearing according to claim 1; wherein the fixed sleeve has a cylindrical shape, the fixed shaft is disposed centrally within the fixed sleeve, and the rotary sleeve is disposed between the fixed shaft and the fixed sleeve.

11. A fluid dynamic pressure bearing according to claim 1; wherein the first, second and third fine gaps have substantially the same width.

12. A fluid dynamic pressure bearing according to claim 1; wherein the rotary sleeve has a cylindrical sleeve portion extending between the fixed shaft and the fixed sleeve, a hub portion extending laterally outward from an outer peripheral surface of the cylindrical sleeve portion opposite the fixed shaft, and a disc-shaped portion connecting the cylindrical sleeve portion and the hub portion.

13. A fluid dynamic pressure bearing according to claim 12; wherein the hub portion of the rotary sleeve has a cup-shaped form; and further comprising a magnet disposed on an inner peripheral surface of the hub portion facing the fixed shaft, and a coil disposed on an outer peripheral surface of the fixed sleeve facing the magnet.

14. A fluid dynamic pressure bearing according to claim 1; wherein the fixed shaft has opposing ends each being fixedly mountable to a support member of an apparatus in which the bearing is used.

15. A fluid dynamic pressure bearing according to claim 1; wherein the third fine gap has a first closed end meeting the closed end of the first fine gap and a second closed end meeting the closed end of the second fine gap.

16. A fluid dynamic pressure bearing, comprising:

a fixed shaft having at least one of a pair of ends fixedly mountable to an apparatus;

a rotary sleeve having an inner peripheral surface arranged adjacent to an outer peripheral surface of the fixed shaft to provide a first fine gap between the inner peripheral surface of the rotary sleeve and the outer peripheral surface of the fixed shaft;

a fixed sleeve having an outer peripheral surface arranged adjacent to an outer peripheral surface of the rotary sleeve to provide a second fine gap between an inner peripheral surface of the fixed sleeve and the outer peripheral surface of the rotary sleeve; and a lubrication oil filled in the fine gaps;

wherein the first fine gap and the second fine gap each have one open end which is in contact with air outside the bearing and one closed end which is not in contact with the air, and the closed ends of the first and second fine gaps are in communication with each other through a third fine gap; and at least one of the first fine gap and the second fine gap are formed with a dynamic pressure producing groove and at least the other is formed with a drawing groove in such a manner that the grooves do not interfere with each other.

17. A fluid dynamic pressure bearing according to claim 16; wherein the first fine gap is formed with a dynamic pressure producing groove, and the second fine gap is formed with a drawing groove.

18. A fluid dynamic pressure bearing according to claim 16; wherein the second fine gap is formed with a dynamic pressure producing groove, and the first fine gap is formed with a drawing groove.

19. A fluid dynamic pressure bearing according to claim 16; wherein a drawing groove is formed in a pair of opposed members forming either of the first and second fine gaps.

20. A fluid dynamic pressure bearing according to claim 16; wherein a drawing groove is formed in only one of a pair of opposed members forming either of the first and second fine gaps.

21. A spindle motor having a rotor including a rotor magnet, a stator including a stator coil opposing the rotor magnet, and a bearing for rotatably supporting the rotor with respect to the stator so that excitation of the stator coil causes the rotor to undergo rotational movement; wherein the bearing comprises the fluid dynamic pressure bearing according to claim 16.

22. A rotary apparatus having a drive source for driving a rotary member; wherein the drive source comprises the spindle motor according to claim 21.

23. A fluid dynamic pressure bearing according to claim 16; wherein the fixed shaft has a cylindrical shape.

24. A fluid dynamic pressure bearing according to claim 16; wherein the fixed sleeve has a cylindrical shape, the fixed shaft is disposed centrally within the fixed sleeve, and the rotary sleeve is disposed between the fixed shaft and the fixed sleeve.

25. A fluid dynamic pressure bearing according to claim 16; wherein the first, second and third fine gaps have substantially the same width.

26. A fluid dynamic pressure bearing according to claim 16; wherein the rotary sleeve has a cylindrical sleeve portion extending between the fixed shaft and the fixed sleeve, a hub portion extending laterally outward from an outer peripheral surface of the cylindrical sleeve portion opposite the fixed shaft, and a disc-shaped portion connecting the cylindrical sleeve portion and the hub portion.

27. A fluid dynamic pressure bearing according to claim 26; wherein the hub portion of the rotary sleeve has a cup-shaped form; and further comprising a magnet disposed on an inner peripheral surface of the hub portion facing the fixed shaft, and a coil disposed on an outer peripheral surface of the fixed sleeve facing the magnet.

28. A fluid dynamic pressure bearing according to claim 16; wherein the fixed shaft has opposing ends each being fixedly mountable to a support member of an apparatus in which the bearing is used.

29. A fluid dynamic pressure bearing according to claim 16; wherein the third fine gap has a first closed end meeting the closed end of the first fine gap and a second closed end meeting the closed end of the second fine gap.

30. A fluid dynamic pressure bearing, comprising:
a fixed shaft having at least one of a pair of ends fixedly mounted to an apparatus;
a rotary sleeve having an inner peripheral surface arranged adjacent to an outer peripheral surface of the fixed shaft to provide a first fine gap between the inner peripheral surface of the rotary sleeve and the outer peripheral surface of the fixed shaft;
a fixed sleeve having an inner peripheral surface arranged adjacent to an outer peripheral surface of the rotary sleeve to provide a second fine gap between the inner peripheral surface of the fixed sleeve and the outer peripheral surface of the rotary sleeve; and
a lubrication oil filled in the fine gaps;
wherein the first fine gap and the second fine gap each have one end which is in contact with air outside the bearing and one end which is not in contact with the air, and the closed ends of the first and second fine gaps are in communication with each other through a third fine gap;
one or both of the first fine gap and the second fine gap are formed with a dynamic pressure producing groove;
a capillary seal is provided in one or both of the open ends of the first fine gap and the second fine gap; and
an auxiliary seal of a fluid reservoir type is formed in the fine gaps at which a capillary seal is provided at a position of the respective fine gap close to a portion of the capillary seal having a minimum groove width.

31. A fluid dynamic pressure bearing according to claim 30; wherein the auxiliary seal portion is formed as an annular groove in a peripheral surface of any of the opposed members forming one of the first and second fine gaps.

32. A fluid dynamic pressure bearing according to claim 31; wherein the annular groove has a substantially semi-circular cross sectional form and is formed in a peripheral surface of any one of a pair of opposed members forming either of the first and second fine gaps.

33. A fluid dynamic pressure bearing according to claim 31; wherein the annular groove has a substantially triangular cross sectional form and is formed in a peripheral surface of any one of a pair of opposed members forming either of the first and second fine gaps.

34. A spindle motor having a rotor including a rotor magnet, a stator including a stator coil opposing the rotor magnet, and a bearing for rotatably supporting the rotor with respect to the stator so that excitation of the stator coil causes the rotor to undergo rotational movement; wherein the bearing comprises the fluid dynamic pressure bearing according to claim 30.

35. A rotary apparatus having a drive source for driving a rotary member; wherein the drive source comprises the spindle motor according to claim 34.

36. A fluid dynamic pressure bearing according to claim 30; wherein the fixed shaft has a cylindrical shape.

37. A fluid dynamic pressure bearing according to claim 30; wherein the fixed sleeve has a cylindrical shape, the fixed shaft is disposed centrally within the fixed sleeve, and the rotary sleeve is disposed between the fixed shaft and the fixed sleeve.

38. A fluid dynamic pressure bearing according to claim 30; wherein the first, second and third fine gaps have substantially the same width.

39. A fluid dynamic pressure bearing according to claim 30; wherein the rotary sleeve has a cylindrical sleeve portion extending between the fixed shaft and the fixed sleeve, a hub portion extending laterally outward from an outer peripheral surface of the cylindrical sleeve portion opposite the fixed shaft, and a disc-shaped portion connecting the cylindrical sleeve portion and the hub portion.

40. A fluid dynamic pressure bearing according to claim 39; wherein the hub portion of the rotary sleeve has a cup-shaped form; and further comprising a magnet disposed on an inner peripheral surface of the hub portion facing the fixed shaft, and a coil disposed on an outer peripheral surface of the fixed sleeve facing the magnet.

41. A fluid dynamic pressure bearing according to claim 30; wherein the fixed shaft has opposing ends each being fixedly mountable to a support member of an apparatus in which the bearing is used.

42. A fluid dynamic pressure bearing according to claim 30; wherein the third fine gap has a first closed end meeting the closed end of the first fine gap and a second closed end meeting the closed end of the second fine gap.

43. A bearing comprising: a fixed shaft having at least one end fixedly mountable to an apparatus; a rotary sleeve disposed about the fixed shaft so that a first fine gap is formed between an inner peripheral surface of the rotary sleeve and an outer peripheral surface of the fixed shaft; a fixed sleeve disposed about the rotary sleeve so that a second fine gap is formed between an inner peripheral surface of the fixed sleeve and an outer peripheral surface of the rotary sleeve; and a lubrication oil filled in the fine gaps; wherein the first fine gap and the second fine gap each have one open end which is in contact with air outside the bearing and one closed end which is not in contact with the air, and the closed ends of the first and second fine gaps are in communication with each other.

44. A bearing according to claim 43; wherein the closed ends of the first and second fine gaps are in communication with each other through a third fine gap.

45. A bearing according to claim 43; further comprising a holding member for holding the fixed shaft and the fixed sleeve arranged adjacent to a lower end surface of the rotary sleeve to provide the third fine gap between the holding member and the lower end surface of the rotary sleeve.

46. A bearing according to claim 45; wherein the third fine gap is formed with a thrust dynamic pressure producing groove.

47. A bearing according to claim 45; wherein the closed ends of the first and second fine gaps are in communication with each other through the third fine gap.

48. A bearing according to claim 43; wherein a peripheral surface of at least one of the fixed shaft, the rotary sleeve and the fixed sleeve forming at least one of the first and second fine gaps has a dynamic pressure producing groove formed therein.

49. A bearing according to claim 43; wherein at least one of the first and second fine gaps has a capillary seal provided at the open end thereof.

50. A bearing according to claim 49; wherein an auxiliary seal of a fluid reservoir type is formed in the fine gap at which the capillary seal is provided.

51. A bearing according to claim 50; wherein the auxiliary seal is provided at a position of the fine gap close to a portion of the capillary seal having a minimum groove width.

52. A bearing according to claim 43; wherein a peripheral surface of at least one of the fixed shaft, the rotary sleeve and the fixed sleeve forming at least one of the first and second fine gaps has a dynamic pressure producing groove formed therein and at least another peripheral surface has a drawing groove formed therein for drawing in the lubrication oil.

53. A bearing according to claim 52; wherein the dynamic pressure producing groove and the drawing groove are formed in such a manner that the grooves do not interfere with each other.

54. A bearing according to claim 43; further comprising a lubrication oil reservoir formed in a peripheral surface of at least one of the fixed shaft, the rotary sleeve and the fixed sleeve in one of the fine gaps, and the one of the fine gaps is also formed with a radial dynamic pressure producing groove.

* * * * *